Jan. 7, 1930.  J. P. McGLYNN  1,742,963
TRIPLE COMBINATION LOCK FOR STEERING GEARS, IGNITION,
AND TRANSMISSION OF MOTOR VEHICLES
Filed March 15, 1927   3 Sheets-Sheet 1
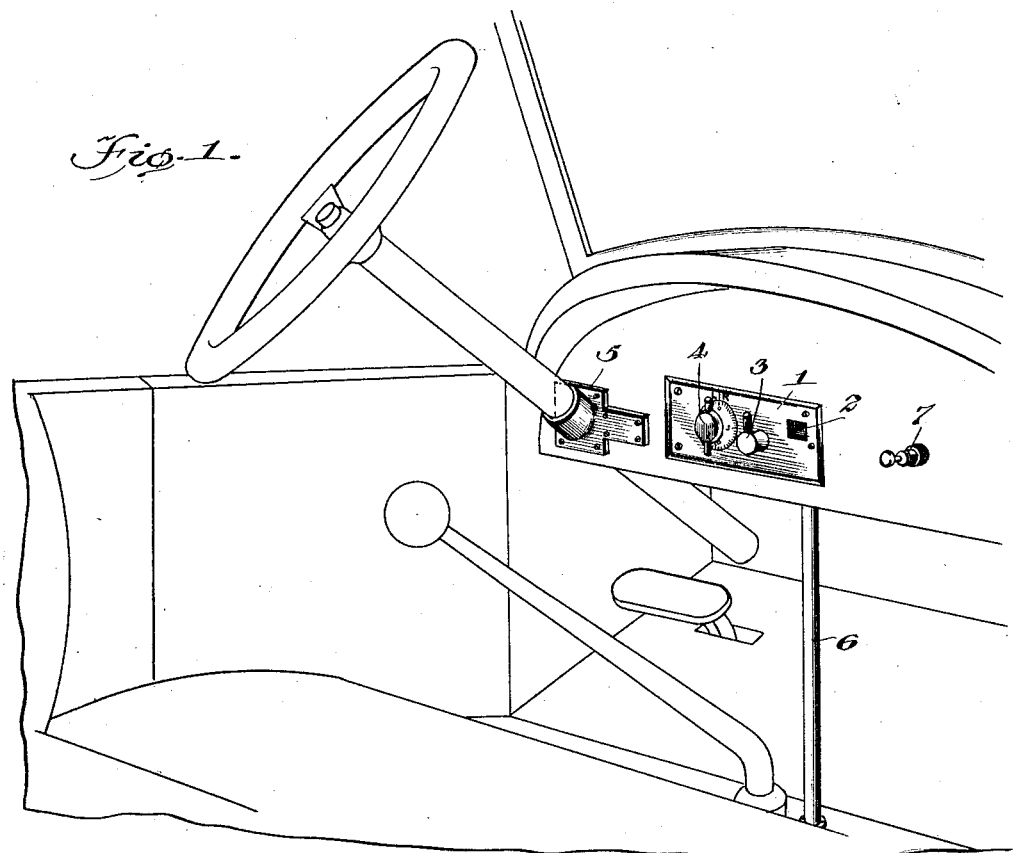
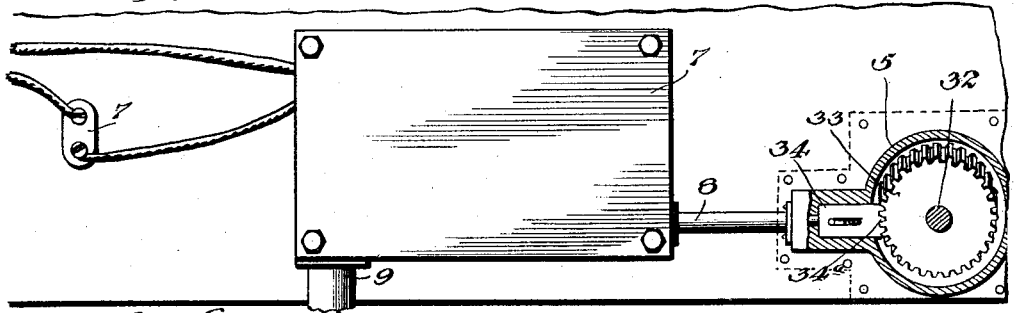
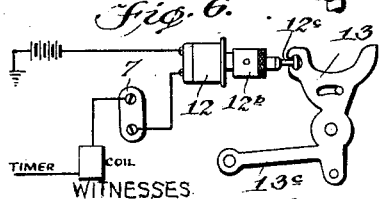
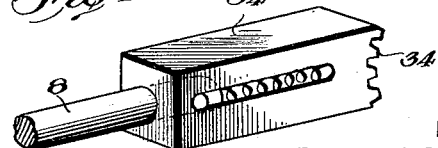
INVENTOR
James P. McGlynn.
BY
ATTORNEYS

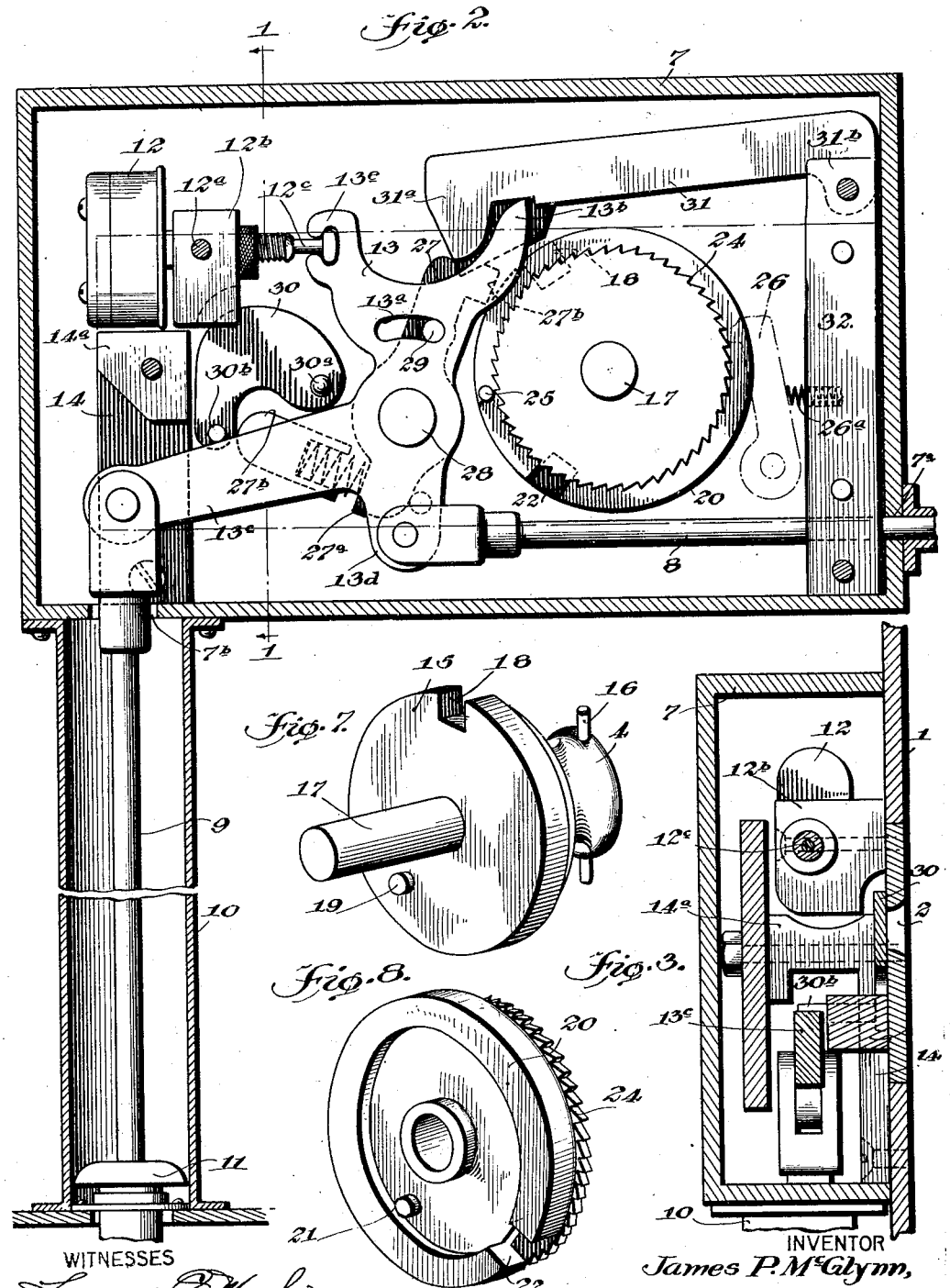

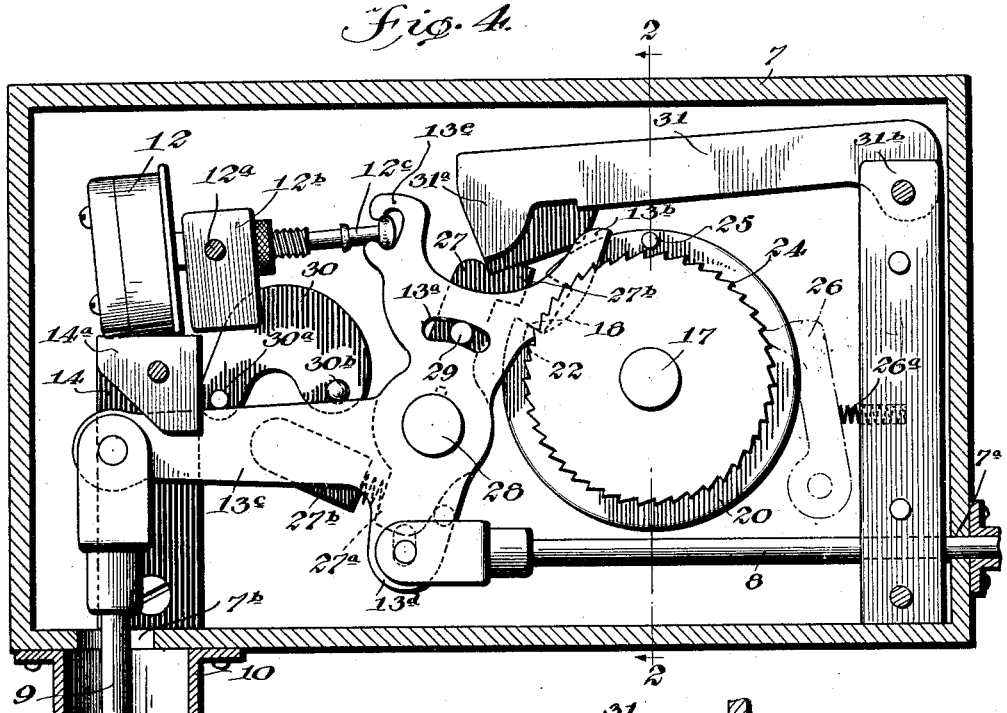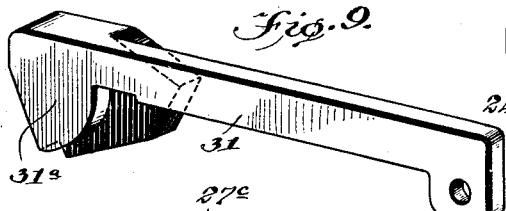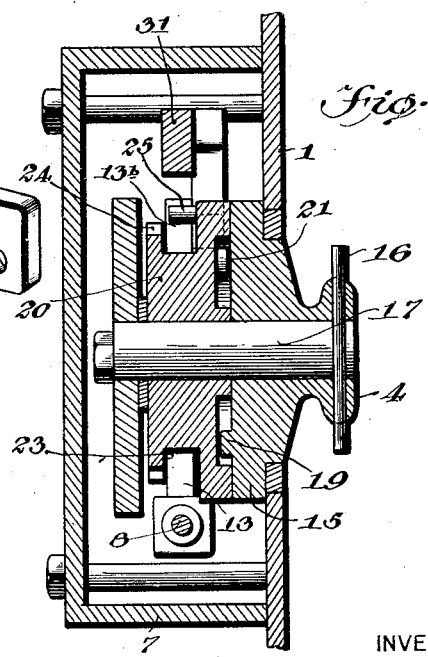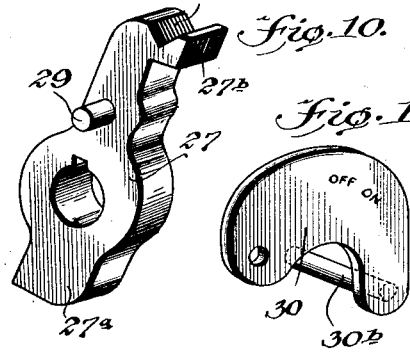

Patented Jan. 7, 1930

1,742,963

UNITED STATES PATENT OFFICE

JAMES P. McGLYNN, OF WILKES-BARRE, PENNSYLVANIA

TRIPLE-COMBINATION LOCK FOR STEERING GEARS, IGNITION, AND TRANSMISSION OF MOTOR VEHICLES

Application filed March 15, 1927. Serial No. 175,547.

The object of this invention is to provide a durable, rugged thief-proof combination lock, operative simultaneously on the ignition system, steering gear and transmission system of a motor vehicle.

A further object of the invention is to provide a positive locking means, that is to say, that in order to stop the motor, the driver must cut off the ignition and thereby perforce lock the vehicle at three points.

Another object is to provide a means whereby all of these operations may be accomplished from the dashboard.

Another object is to provide a simple combination lock to make the device operable, said lock to respond to a two-number combination, the number of combinations being limited, however, only by the size of the dials employed.

While I will describe the operation of my lock as applied to automobiles it is to be understood that it may be used on airplanes, tractors or safes, in fact, anywhere that it would be normally suggested to those skilled in the art to employ it.

Among the advantages attained by my construction may be cited the absence of keys or outside wires, the fact that the setting of the combination turns on the ignition and unlocks the transmission and steering wheel and the universal applicability of the lock to any mechanism using ignition, transmission and a steering column.

Referring more to the drawings:

Figure 1 illustrates the device fitted to the dashboard of an automobile as seen from the front seat thereof, Figure 2 shows a rear view with cover plate removed, of the mechanism in locked position, Figure 3 shows a section of Fig. 1, looking toward the right, taken on line 1—1, of Figure 2, Figure 4 shows the device in unlocked position, under the same conditions as in Fig. 2, Figure 5 shows a section of the lock in position as in Fig. 4, taken on the line 2—2 and looking toward the left, Figure 6 shows a diagram of the common electric ignition circuit of the car and a detail of how the switch button is held by the rocking cam of the lock, Figure 7 shows a perspective view of the outer dial, that is, the one closest to the dashboard, seen from the rear, Figure 8 shows a front view of the inner dial in perspective, Figure 9 shows a perspective view of the blocking dog, Figures 10 and 11 show perspective views of the dial engaging member and of the indicator, respectively, Figure 12 shows a rear view, that is from the motor side of the dash of the steering gear locking mechanism in locked position and illustrates the gear which is applied to the steering column, and Figure 13 shows a detail of the gear locking bolt for locking the steering gear.

Referring now to Fig. 1, 1 indicates a metal plate of substantial thickness which acts as a front cover for the lock. 2 is a hole or window in this cover, through which the indicator can be seen and the words "on" and "off" read thereon. 3 is the operating knob or handle of the lock and 4 is a combination knob and dial. 5 indicates a cover plate for a gear attached to the steering column of the car into which one of the locking members engages. 6 is the transmission locking rod which fits into a hole bored into the projecting tumbler of the regular transmission lock of the car. 7 indicates an electric switch, hereinafter referred to as the coasting switch, the purpose of same being to cut off the ignition by hand operation, when the car is coasting down hill or in emergencies.

In Figs. 2, and 4, 7 is a strong steel box or casing enclosing the lock. In this casing, two holes are bored, $7^a$ to receive the steering gear locking rod 8 and $7^b$ to receive the transmission locking rod 9. A strong tube 10 encloses the rod 9 and is fastened securely to 7 and extends therefrom to the floor of the car, protecting the rod 9 and transmission lock 11 from tampering.

Within the casing is contained an electric ignition switch 12 of the button push and pull type. It is swingably mounted on the casing 7 by a pin $12^a$, set in a block $12^b$. Its button or handle 12ᶜ is loosely held within a slot in the rocking cam 13. A small amount of rotation or tilt is allowed the switch by the pivot mounting, but the member 14 whose shoulder 14ᵃ abuts the switch body acts as a limiting stop. The switch is shown in its inclined position in Fig. 4.

The pair of dials of the combination lock, both illustrated in Figs. 7 and 8, together form the means of allowing the mechanism to function. Both dials are arranged within the box or casing with the dial 15 revoluble in a circular opening provided in the front wall of this box or casing. The knob projects through the casing and the dial is shouldered to project flush with the casing and provide space for the scale shown in Fig. 1 to be placed on the projecting circular portion. The knob and outer scale dial may also be made in one piece and may fit the shaft 17 and be fastened to it by the pin 16 which goes entirely through the shaft 17. Inside casing 7, the dial 15 has a substantially square notch 18, of considerable size, and, approximately oppositely located, a pin 19 projecting therefrom.

Dial 20, shown in Fig. 8 fits on shaft 17 and the face shown in the drawing is placed against the face of dial 15, as shown in Fig. 7. In this position, pin 19 and pin 21 will engage each other so that dial 15 will drive dial 20. The latter dial has also a square notch 22 of identical size as 18, in its periphery the front edge of said periphery being also provided with a groove 23, and shoulder with a toothed projecting edge 24. This latter construction is shown clearly in Fig. 5. The pin 25 is carried on the inner shoulder as shown in Figs. 2, 4 and 5, and engages the curved surface of rocking cam 13. A pawl 26 is pivoted against cover 1 so as to engage the teeth of 24 whereby counterclockwise rotation of the dial 20 is prevented. A spring 26ᵃ holds the pawl against the toothed edge.

To work the combination, the dial 20 is moved until its square notch is in proper position to receive dog 27. The dial 15 is then brought back a sufficient distance to make the square notch on it coincide with that on the other dial. The projection 27ᵇ of the dog 27 can now be slipped into the notches by manipulation of the handle 3 to the left, thus actuating the actual locking members to unlock them.

When it is again desired to lock the combination, the dog 27 is lifted out of the notches by the reverse movement of the handle and the dials are spun sufficiently to make the pin 25 push over the rocking cam 13, which actuates the locking members to place them in locking position.

The combinations can be changed by altering either the positions of the square notches, or of pins 19 and 21 or of the relative numbering on the knob dial.

Referring now again to Figs. 2 and 4, the dog 27 is keyed fast to the shaft 28. This shaft in turn has keyed to it on the other side of the dash, the operating handle 3. On the shaft 28 toward the motor of the vehicle, there is tiltably mounted the rocking cam 13 independently of 27. In its body portion there is a slot 13ᵃ which receives the pin 29, which has a driving fit in the body of dog 27. The length of the arcuate slot 13ᵃ is not quite as long as the travel of pin 29, therefore said pin will tilt rocking cam 13 when it engages either side of 13ᵃ. At the tail portion 27ᵃ of the dog there is carried in a hole bored into its side, a spring which in turn carries a cap 27ᵇ. This means by its bearing against the tip of indicator 30, returns the dog, after operation to a position with the square tooth 27ᵇ clear of the notches.

There is a V-shaped notch 27ᶜ in the top edge of dog 27 and its purpose is to accommodate the tooth 31ᵃ of blocking dog 31. When the mechanism is locked, this tooth slips down into 27ᶜ and holds 27 so that the tooth 27ᵇ can not be pushed into the square notches of the dials by lifting on the rod 9 or pushing backward the rod 8. The blocking dog is illustrated in Fig. 9 and is hinged as to its right end as seen in Figs. 2 and 4. Its left end can not be well described, but its shape will be instantly apparent by reference to Fig. 9. The shaded portion there shown has a slanting straight edge adapted to slide over the curved top of dog 27 when first lifted up by the tail 13ᵇ of cam 13. The hinge pin 31ᵇ and its supporting bar somewhat spaced from the wall of 7, is shown at 32.

The rocking cam 13 is a very important member. Its shape is apparent from Figs. 2, 4 and 6. Two lever like projections 13ᶜ and 13ᵈ, swingably hold the rods 8 and 9 respectively. The cam edged tail 13ᵇ, the slot 13ᵃ and the mounting on shaft 28 have already been described. A hook member 13ᵉ into which the switch button fits, completes the members of the rocking cam. It will be evident that when the cam is tilted about shaft 28 the four ends of the cam will accomplish mechanical movements, namely, the pushing or pulling of rods 8 and 9, and of the switch button and the lifting or lowering of blocking dog 31. None of these movements can be performed without all of them being accomplished. In addition to those listed above, an indicator 30, illustrated in Fig. 11 and on Figs. 2 and 4, is operated.

This indicator is hinged to casing 7 at 30ᵃ and at its other end bears a projecting pin 30ᵇ which lies against the upper edges of 13ᶜ and moves therewith. The movement of 13ᶜ brings successively before the window 2, the words "off" and "on" according to the position of the lock.

Figs. 12 and 13 illustrate the steering gear locking element. 32 in Fig. 12 is the steering post on which is keyed the gear 33. A housing 5 is placed around the gear and on the dash. Inside the housing slides the rod 8 and a toothed member which is hollow and contains a spring. The spring serves to keep the teeth 34ª as far from the rod 8 as possible.

When the rod 8 is in extended position, it is obvious that the teeth 34ª will engage the gear teeth under tension, thus locking the steering column against rotation when rod 8 is retracted, 34 will follow, being fast thereto.

Having now described the invention I wish it to be understood that I claim as my own such equivalent constructions and devices that would obviously occur to those skilled in the art, provided such modified constructions and devices come within the scope of the appended claims.

I claim:—

1. In a locking mechanism, a housing, a pair of dials within said housing, an operating handle for said dials projecting through said housing, notches in each of said dials, return-stopping means for one of said dials, a rocking cam to which a plurality of locking and unlocking members are actually fastened, a dog engageable with the notches of the dials when same are in aligned position, a common shaft upon which the dog and the cam are mounted and means whereby the cam is actuated after a given amount of rotation of the dog.

2. In a locking mechanism, a housing, a pair of dials within said housing, an operating knob and dial, projecting through said housing on the dial adjacent said first dial for driving the second of said dials, a common shaft upon which the two dials are mounted the first tightly thereon and the second loosely thereon, notches on an extension of the periphery of the second dial and a pawl engaged therewith to prevent backward rotation, deep notches in the periphery of each of the dials and an unlocking dog member engageable with said notches when same are in position to receive said dog member, and means actuable by said dog to manipulate the locking members of the lock and a blocking member engaging with said dog preventing opening of the lock by the reverse pushing of the locking members the whole constituting a combination lock.

3. In a locking mechanism having a combination lock of the kind described in claim 2, a rocking cam tiltably mounted on the same shaft as the unlocking dog member, said cam having therein an arcuate slot, a pin in the dog engaging said slot after a given amount of tilting of said dog whereby said cam will also be tilted, two locking bars fulcrumed on said cam and actuable by its tilting and a hook extension on said cam holding the button of an electric switch potentially manipulatable by said extension and said button.

4. In a theft preventing device for motor vehicles, a casing, a rocking member supported therein, right angularly disposed rods operatively connected therewith and engaging the steering gear and transmission respectively of a motor vehicle, a plurality of permutation lock disks arranged to one side of the rocking member and each having a notch therein, a locking element carried by the rocking member having an extension upon one end normally engaging the lock disks to prevent movement of the rocking member, the disks being operable to dispose the notches in registration to permit the extension to pass therein so that the rocking member may be actuated to retract the rods.

5. In a theft preventing device for motor vehicles, a casing, a rocking member supported therein, right angularly disposed rods operatively connected therewith and engaging the steering gear and transmission respectively of a motor vehicle, a plurality of permutation lock disks arranged to one side of the rocking member and each having a notch therein, a locking element carried by the rocking member having an extension upon one end normally engaging the lock disks to prevent movement of the rocking member, the disks being operable to dispose the notches in registration to permit the extension to pass therein so that the rocking member may be actuated to retract the rods, and an ignition switch operatively connected with the rocking member to be actuated to operative and inoperative positions upon movement of the latter.

6. In a lock mechanism, a manually operable rocking member, a plurality of permutation locking disks arranged to one side of the rocking member and each having a notch therein, a locking element carried by the rocking member provided with an extension which normally engages the disks to prevent movement of the rocking member in one direction, the disks being operable to dispose the notches in registration to permit the extension to fall therein to permit the rocking member to be actuated, and a pivoted latch element normally engaging the locking element for holding the latter in inoperative position.

7. In a theft preventing device for motor vehicles, a casing, a rocking member supported therein and having a plurality of arms for connection with control parts of a motor vehicle, a plurality of permutation lock disks arranged to one side of the rocking member and each having a notch therein, a locking element carried by the rocking member having an extension upon one end and normally engaging the disks to prevent movement of the rocking member, the disks being operable to dispose the notches in registration to permit the extension to pass therein so that the rocking member may be manually actuated.

JAMES P. McGLYNN.